(12) United States Patent
Kokura

(10) Patent No.: US 11,739,925 B1
(45) Date of Patent: Aug. 29, 2023

(54) CARGO VEHICLE

(71) Applicant: Mitsubishi Logisnext Co., Ltd., Kyoto (JP)

(72) Inventor: Kazumasa Kokura, Kyoto (JP)

(73) Assignee: Mitsubishi Logisnext Co., Ltd., Kyoto (JP)

( * ) Notice: Subject to any disclaimer, the term of this patent is extended or adjusted under 35 U.S.C. 154(b) by 0 days.

(21) Appl. No.: 17/878,921

(22) Filed: Aug. 2, 2022

(30) Foreign Application Priority Data

May 30, 2022 (JP) .................................. 2022-087433

(51) Int. Cl.
| | | |
|---|---|---|
| *F21V 23/04* | (2006.01) | |
| *F21S 43/00* | (2018.01) | |
| *B60Q 1/50* | (2006.01) | |
| *B66F 17/00* | (2006.01) | |
| *F21W 103/60* | (2018.01) | |

(52) U.S. Cl.
CPC .......... *F21V 23/0471* (2013.01); *B60Q 1/503* (2013.01); *B60Q 1/543* (2022.05); *B66F 17/003* (2013.01); *F21S 43/00* (2018.01); *B60Q 2400/50* (2013.01); *F21W 2103/60* (2018.01)

(58) Field of Classification Search
CPC ...... F21V 23/0471; F21S 43/00; B60Q 1/503; B60Q 1/543; B60Q 2400/50; B66F 17/003; F21W 2103/60
See application file for complete search history.

(56) References Cited

U.S. PATENT DOCUMENTS

| | | | |
|---|---|---|---|
| 10,160,380 B1 * | 12/2018 | Salter ................... | B60Q 1/2665 |
| 2018/0224297 A1 * | 8/2018 | Schreiber ............. | H04N 9/3179 |

FOREIGN PATENT DOCUMENTS

| | | |
|---|---|---|
| DE | 102012020312 | 4/2014 |
| EP | 2692687 | 5/2015 |
| JP | 2016132535 | 7/2016 |

OTHER PUBLICATIONS

"Search Report of Europe Counterpart Application", dated May 24, 2023, p. 1-p. 8.

* cited by examiner

*Primary Examiner* — Thomas M Sember
(74) *Attorney, Agent, or Firm* — JCIPRNET

(57) ABSTRACT

A forklift 1 as a cargo vehicle includes: a vehicle body 1A which an operator M gets on; and an image projection device 31, projecting an image related to vehicle information in a direction (left) in which the operator M alights to display the image on a road surface G. In addition, the forklift 1 further includes an alighting sensor that detects an alighting operation when the operator M alights. The image projection device 31 projects the image when the alighting sensor detects the alighting operation.

5 Claims, 4 Drawing Sheets

(A)

(B)

(A)

(B)

CARGO VEHICLE

CROSS-REFERENCE TO RELATED APPLICATION

This application claims the priority benefit of Japan application serial no. 2022-087433, filed on May 30, 2022. The entirety of the above-mentioned patent application is hereby incorporated by reference herein and made a part of this specification.

BACKGROUND

Technical Field

The invention relates to a cargo vehicle displaying vehicle information.

Description of Related Art

Conventionally, a forklift, which is a cargo vehicle, includes a display device displaying vehicle information. The display device is formed by a meter panel, a display, etc., and is provided in front of a seat, so that an operator seated at the seat can easily verify vehicle information (see, for example, Patent Document 1).

However, even in the case where the vehicle information that should be verified is displayed on the display device, the operator may still alight without taking a look at the display device. That is, the operator may forget to verify vehicle information when alighting.

PRIOR ART DOCUMENT

Patent Document

[Patent Document 1] Japanese Laid-open No. 2016-132535

SUMMARY

A cargo vehicle according to the invention includes: a vehicle body, which an operator gets on; and an image projection device, projecting an image related to vehicle information in a direction in which the operator alights to display the image on a road surface.

In addition, it may also be that the cargo vehicle further includes an alighting sensor, detecting an alighting operation when the operator alights, and when the alighting sensor detects the alighting operation, the image projection device projects the image.

In addition, it may also be that the alighting sensor is configured by a seat leaving sensor detecting that the operator leaves a seat provided at the vehicle body In addition, it may also be that the alighting sensor is configured by a motion sensor detecting a part of the operator.

In addition, it may also be that the cargo vehicle further includes: a key switch, configured to be switchable between a power-ON state and a power-OFF state; and a power circuit, supplying power to the image projection device until a predetermined time passes when the key switch is switched from the power-ON state to the power-OFF state.

DESCRIPTION OF THE EMBODIMENTS

Figure 1:
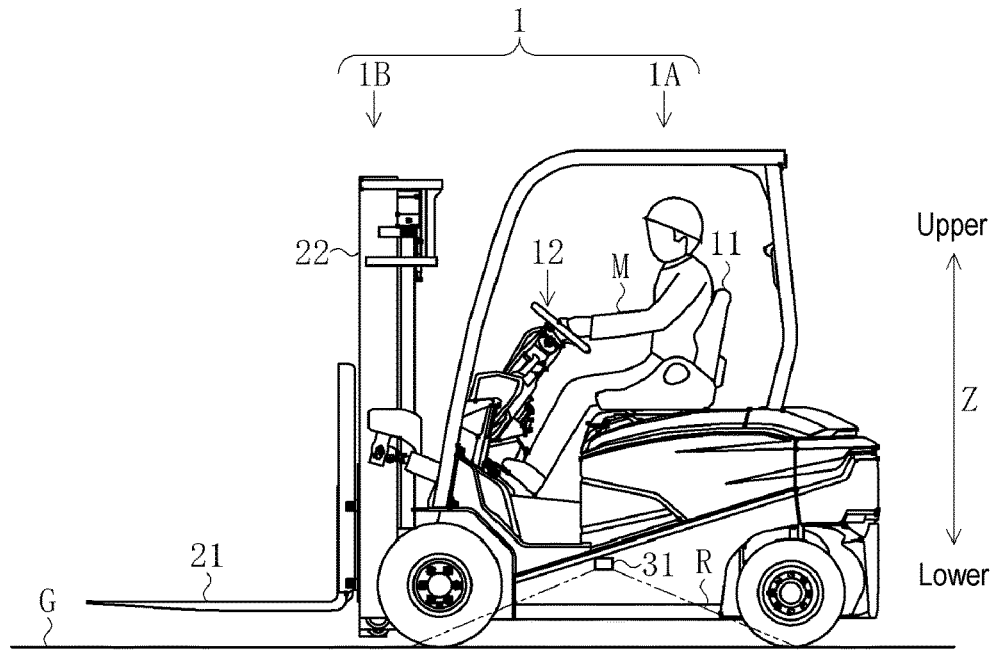
In FIG. 1, (A) is a side view illustrating a schematic configuration of a cargo vehicle according to an embodiment of the invention, and (B) is a plan view illustrating the schematic configuration of the cargo vehicle according to the embodiment of the invention.
Figure 1:
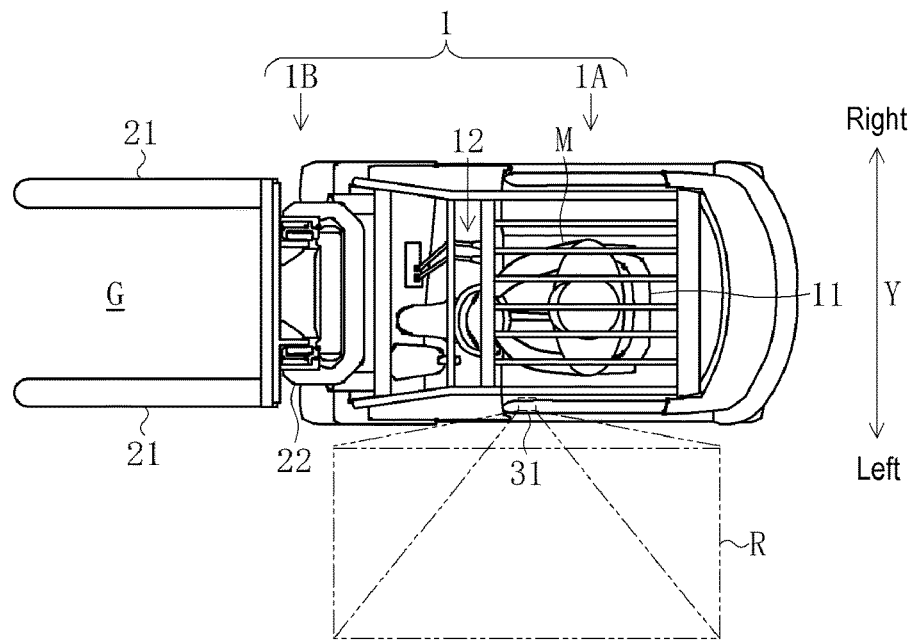

The invention provides a cargo vehicle allowing an operator to easily verify vehicle information when alighting.

A forklift 1, which is a cargo vehicle according to an embodiment of the invention, is described with reference to the drawings. As indicated by arrow signs in the drawings, a front-rear direction X, a left-right direction Y, and an upper-lower direction Z are linear directions orthogonal to each other.

As shown in (A) and (B) of FIG. 1, the forklift 1 of a counterbalance type includes a vehicle body 1A traveling on a road surface G and a cargo device 1B handling a load (not shown). The cargo device 1B is provided at the front of the vehicle body 1A.

As forming components provided at the vehicle body 1A, the forklift 1 includes a seat 11 where an operator M is seated and an operation device 12 for the operator M to operate the forklift 1. The operation device 12 is formed by a pedal, a handle, and a lever, etc., and is provided at the front of the seat 11.

In addition, as forming components of the cargo device 1B, the forklift 1 includes a fork 21 that can be inserted into a pallet (not shown), and a lift device 22 lifting or lowering the fork 21 based on a command of the operator M.

In addition, the forklift 1 includes an image projection device 31 provided at the vehicle body 1A. A two-dot chain line R shown in (A) and (B) of FIG. 1 indicates a projection range of the image of the image projection device 31. When an alighting sensor 36 (see FIG. 2) to be described afterwards detects an alighting operation of the operator M, the image projection device 31 projects images I1 to I6 (see (A) to (C) o FIG. 3 and (A) to (C) of FIG. 4) related to vehicle information in a direction in which the operator M alights (that is, the left of the vehicle body 1A) to display the images I1 to I6 on the road surface G.

Figure 2:
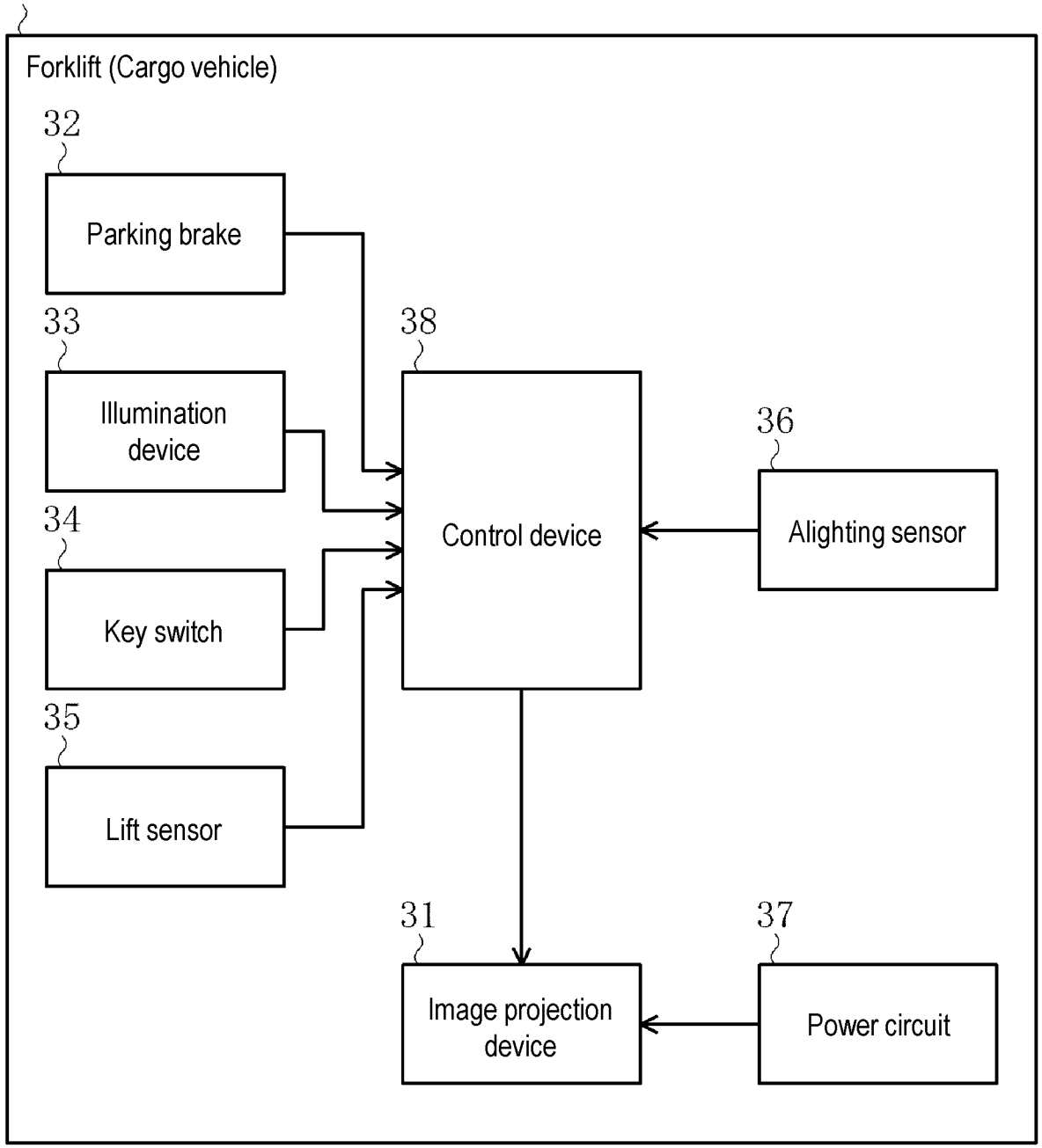
FIG. 2 is a block diagram illustrating a schematic configuration of the cargo vehicle of the embodiment.

FIG. 2 is a block diagram illustrating a schematic configuration of the forklift 1. As shown in FIG. 2, the forklift 1 includes, as forming components associated with the image projection device 31, a parking brake 32, an illumination device 33, a key switch 34, a lifting sensor 35, the alighting sensor 36, a power circuit 37, and a control device 38.

The parking brake 32 limits the traveling of the vehicle body 1A when the forklift 1 is parked. The parking brake 32 uses, for example, a parking brake lever or a parking brake pedal (none of which is shown) forming the operation device 12, and is configured to be switchable between a brake-ON state in which the traveling of the vehicle body 1A is limited and a brake-OFF state in which the traveling of the vehicle body 1A is not limited.

The illumination device 33 illuminates the road surface, etc., by projecting light toward the front of the forklift 1. The illumination device 33 uses a headlight switch (not shown) forming the operation device 12, for example, and is configured to be switchable between a headlight-ON state projecting light and a headlight-OFF state not projecting light.

The key switch 34 opens and closes a circuit connected with the power (not shown) of the forklift 1. The key switch 34 uses a key (not shown) inserted into the key switch 34 and is configured to be switchable between a power-ON state and a power-OFF state. The power-ON state is a state in which the key switch 34 closes the circuit to validate a traveling function that the vehicle body 1A travels, a cargo function that the cargo device 1B handles cargo, and other predetermined functions. In addition, the power-OFF state is a state in which the key switch 34 opens the circuit to invalidate the traveling function, the cargo function, etc. It is noted that, not all functions are invalidated in the power-OFF state. For example, the illumination function with which the illumination device 33 illuminates the road surface, etc., is constantly validated. Therefore, it is configured that power is supplied to the illumination device 33 irrelevant of the power-ON state and the power-OFF state.

The lifting sensor 35 is provided in the lift device 22 (specifically a mast), and detects a lifting height (height from the road surface G) of the fork 21. By detecting a height equal to or greater than a predetermined lifting height, the lifting sensor 35 detects a non-grounded state in which the fork 21 is not in contact with the road surface G, and by detecting a height less than the predetermined lifting height, the lifting sensor 35 detects a grounded state in which the fork 21 is in contact with the road surface G.

The alighting sensor 36 detects the alighting operation when the operator M alights. In the embodiment, the alighting sensor 36 is configured by a seat leaving sensor detecting that the operator M leaves the seat 11. The seat leaving sensor is configured by a load sensor that detects a load acting on the seat 11.

The power circuit 37 supplies power to the image projection device 31. When the key switch 34 is switched from the power-ON state to the power-OFF state, the power circuit 37 includes a timer function supplying power to the image projection device 31 until a predetermined time passes. That is, when the key switch 34 is switched from the power-ON state to the power-OFF state, it is configured that power is supplied to the image projection device 31 until a predetermined time passes, and when the predetermined time passes, the power supply to the image projection device 31 is cut off.

The control device 38 obtains the vehicle information which is information related to the forklift 1, and controls the image projection device 31 so that an image in accordance with the vehicle information is projected on the road surface G. That is, the control device 38 changes the image projected by the image projection device 31. The control device 38 obtains information from the parking brake 32, the illumination device 33, the key switch 34, the lifting sensor 35, and the respective parts of another forklift 1.

Figure 3:
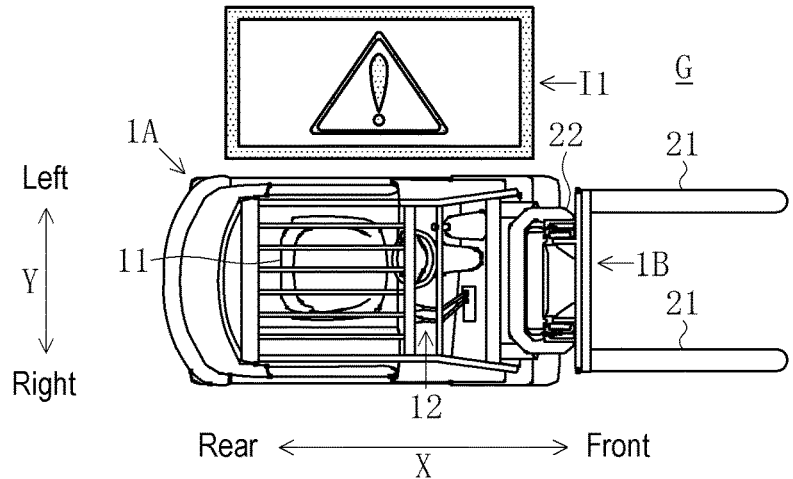
In FIG. 3, (A) to (C) are plan view illustrating states in which an image projection device projects an image.
Figure 3:
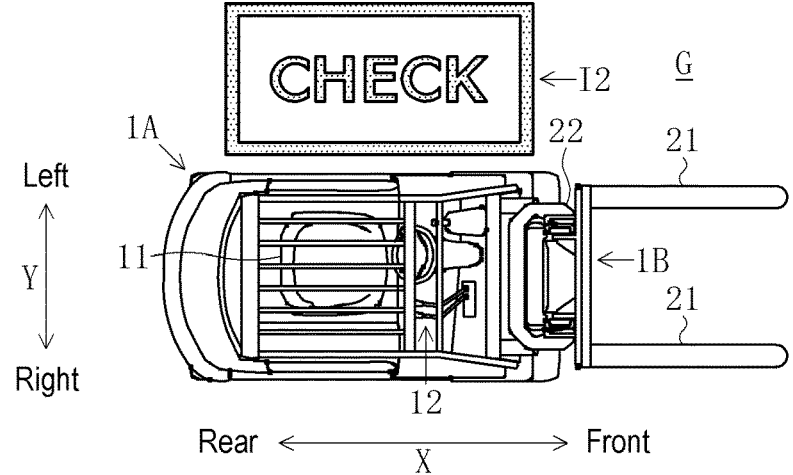
Figure 3:
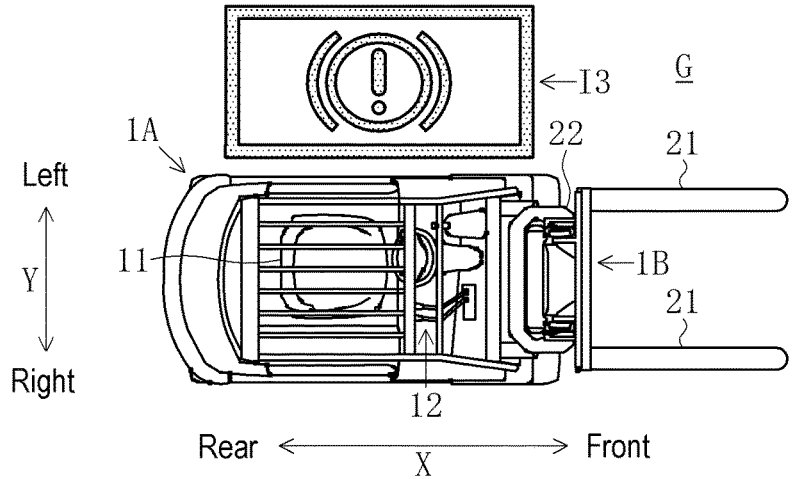
Figure 4:
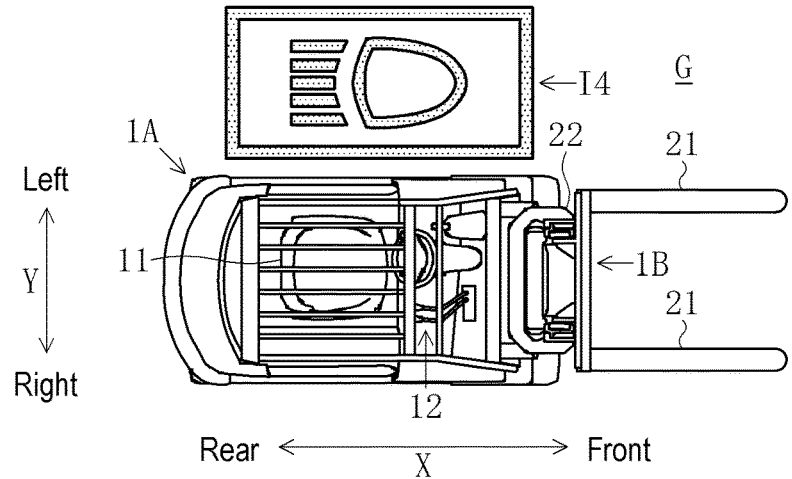
In FIG. 4, (A) to (C) are plan view illustrating states in which the image projection device projects an image.
Figure 4:
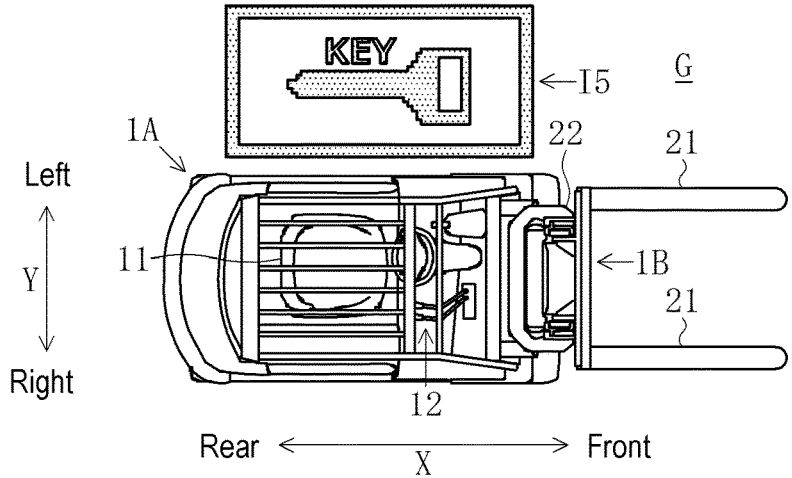
Figure 4:
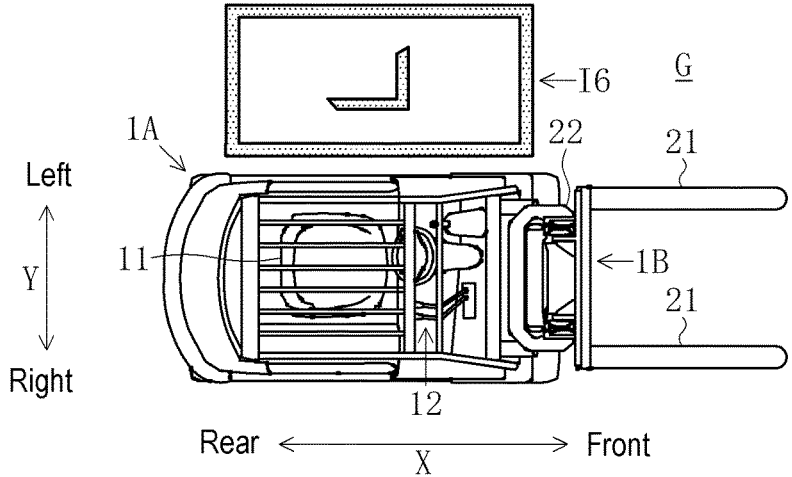

Referring to (A) to (C) of FIG. 3 and (A) to (C) of FIG. 4, the images I1 to I6 projected by the image projection device 31 are described.

When the system including the forklift 1 is not normal, the image projection device 31 projects and displays the image I1 shown in (A) of FIG. 3 on the road surface G. That is, the image I1 is an image for urging maintenance of the forklift 1, and includes an attention rousing mark (pictogram) that calls attention to the use of the forklift 1.

In addition, when a predetermined switch (except for the key switch 34) included in the forklift 1 is not in an arbitrary state, the image projection device 31 projects and displays the image I2 shown in (B) of FIG. 3 on the road surface G. That is, the image I2 is an image for urging to check a switch included in the forklift 1, and includes a check rousing mark (text) that calls attention to checking the switch.

In addition, when the parking brake 32 is not in the brake-ON state, the image projection device 31 projects and displays the image I3 shown in (C) of FIG. 3 on the road surface G. That is, the image I3 is an image for urging to check the parking brake 32 (to switch to the brake-ON state), and includes a mark (pictogram) indicating that the parking brake 32 is in the brake-OFF state.

In addition, when the illumination device 33 is not in the headlight-OFF state, the image projection device 31 projects and displays the image I4 shown in (A) of FIG. 4 on the road surface G. That is, the image I4 is an image for urging to check the illumination device 33 (to switch to the headlight-OFF state), and includes a mark (pictogram) indicating that the illumination device 33 is in the headlight-ON state.

In addition, when the key switch 34 is not in the power-OFF state, the image projection device 31 projects and displays the image I5 shown in (B) of FIG. 4 on the road surface G. That is, the image I5 is an image for urging to check the key switch 34 (to switch to the power-OFF state), and includes a mark (text and pictogram) indicating that the key switch 34 is in the power-ON state.

In addition, when the lifting sensor 35 does not detect the grounded state of the fork 21, the image projection device 31 projects and displays the image I6 shown in (C) of FIG. 4 on the road surface G. That is, the image I6 is an image for urging to check the lifting height of the fork 21 (to lower the fork 21), and includes a mark (pictogram) indicating that the fork 21 is in the non-grounded state.

When projecting two or more of the images I1 to I6, the image projection device 31 projects and displays the two or more images in order by dividing the two or more images with a predetermined time interval.

In the embodiment, the following effects are obtained.
(1) The images I1 to I6 related to the vehicle information can be projected to and displayed under the feet of the operator M. Therefore, by taking a look at the images I1 to I6 under the feet when alighting, the operator M can easily verify the vehicle information.
(2) The image projection device 31 projects the images I1 to I6 when the alighting sensor 36 detects an alighting operation. According to the configuration, by displaying the images I1 to I6 only at the time when the operator M alights, energy can be saved.
(3) The alighting sensor 36 is configured by the seat leaving sensor detecting that the operator M leaves the seat 11. According to the configuration, the alighting sensor 36 can detect the alighting operation of the operator M when the operator M stands up from the seat 11.
(4) When the key switch 34 is switched from the power-ON state to the power-OFF state, the forklift 1 further includes the power circuit 37 supplying power to the image projection device 31 until a predetermined time passes. According to the configuration, even when the key switch 34 is in the power-OFF state, the images I1 to I6 can be projected only within a predetermined time, and, after the predetermined time passes, energy can be saved.

The invention is not limited to the above embodiment, and the above configuration can be changed. For example, the changes as follows can also be implemented, and the changes as follows can also be combined and implemented.

The configuration of the alighting sensor 36 may also be changed as appropriate. For example, the alighting sensor 36 may also be configured by a motion sensor detecting a part of the operator. According to the configuration, the alighting sensor 36 can detect the alighting operation of the operator M by detecting a part (e.g., the foot to land on the road surface G) of the operator M.

The arrangement and the configuration of the image projection device 31 may also be changed as appropriate, and the image projected on the road surface G may also be changed as appropriate. In addition, it may also be configured that the image is projected on the right of the vehicle body 1A. Moreover, it may also be configured that the image is projected onto the periphery, including the front and the rear of the vehicle body, in addition to the lateral side of the vehicle body 1A.

A cargo vehicle (e.g., a reach-type forklift, a side forklift, an order-picking truck, a tractor, or a container handler) other than the counterbalance forklift 1 is also suitable for the invention.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A cargo vehicle, comprising:
   a vehicle body, which an operator gets on;
   an image projection device, projecting an image related to vehicle information in a direction in which the operator alights to display the image on a road surface;
   a fork disposed on the vehicle body; and
   a lift device configured for lifting or lowering the fork, wherein the lift device comprises a lifting sensor configured to detect a lifting height of the fork, when the lifting sensor detects the fork not in contact with the road surface, the image projection device projects and displays a first image of the image on the road surface.

2. The cargo vehicle as claimed in claim 1, further comprising: an alighting sensor, detecting an alighting operation when the operator alights,
   wherein when the alighting sensor detects the alighting operation, the image projection device projects the image.

3. The cargo vehicle as claimed in claim 2, wherein the alighting sensor is configured by a seat leaving sensor detecting that the operator leaves a seat provided at the vehicle body.

4. The cargo vehicle as claimed in claim 2, wherein the alighting sensor is configured by a motion sensor detecting a part of the operator.

5. The cargo vehicle as claimed in claim 1, further comprising:
   a key switch, configured to be switchable between a power-ON state and a power-OFF state; and
   a power circuit, supplying power to the image projection device until a predetermined time passes when the key switch is switched from the power-ON state to the power-OFF state.

* * * * *